UNITED STATES PATENT OFFICE.

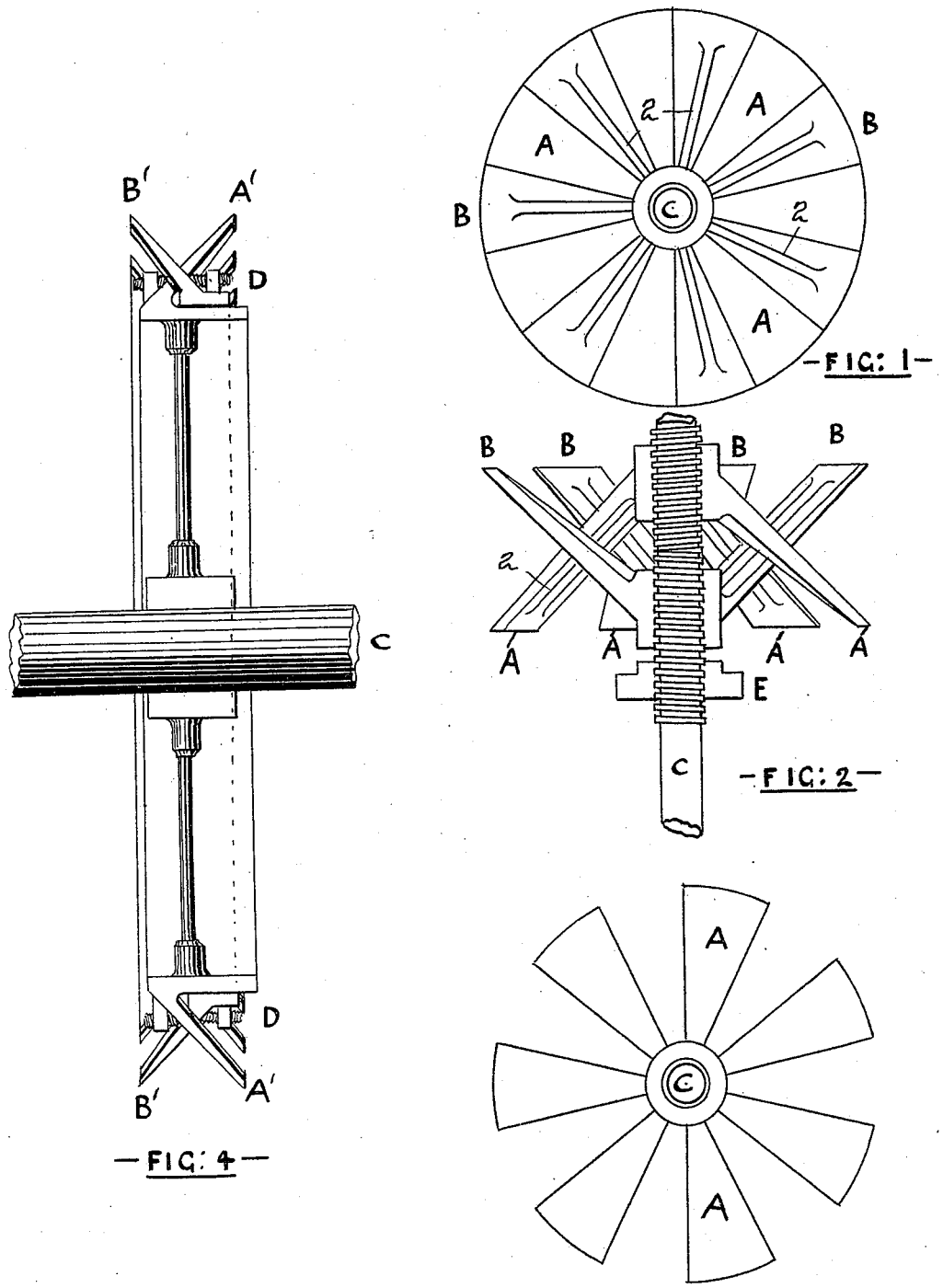

ANDREW GIVEN AND CHARLES BOWTELL SMITH, OF DUNEDIN, NEW ZEALAND.

EXPANDING PULLEY.

SPECIFICATION forming part of Letters Patent No. 516,197, dated March 13, 1894.

Application filed July 12, 1893. Serial No. 480,263. (No model.)

*To all whom it may concern:*

Be it known that we, ANDREW GIVEN, paper merchant, and CHARLES BOWTELL SMITH, bookbinder, subjects of the Queen of Great Britain, residing at Dunedin, in the British Colony of New Zealand, have invented a new and useful Pulley Capable of Having its Working Diameter Increased or Decreased, of which the following is a specification.

The construction is as follows: Two cones with conical rims are divided into a number of equal parts, tending toward the center, each alternate part being cut away; these cones can be made to interlace, by being turned in opposite directions, when it will be found that when they are placed closer together, a smaller pulley is obtained; while when drawing them farther apart a larger pulley is obtained within the limits of the sizes of the cones, and these may be secured at any point within such limits. This pulley may be made so that it is perfectly balanced in every part when so required for high class and quick speed machinery, and it can be used both for the purpose of altering the speed of a machine, or any part or parts of the same readily; or merely for the purpose of tightening the belting when if the speed is required to be about the same, or if otherwise found necessary, two pulleys may be used to each belt.

The features of our invention do not lie broadly in the construction above set forth but in the special form and arrangement of parts hereinafter set forth.

Referring to the accompanying drawings; Figure 1, is an end view; and Fig. 2, is a sectional elevation of a small size complete pulley. Fig. 3, is an end view of one of the halves of the same pulley to show the construction more distinctly. Fig. 4, is a sectional elevation of a large pulley showing another method of applying the same invention.

Similar letters and figures refer to similar parts as far as such parts are common.

Referring to Figs. 1, 2 and 3, A, A, show one side or set of wings, and B, B, show the other side or set of wings, in a complete pulley. These may be plain, that is, without ribs or projections, as shown Fig. 3, or may be strengthened in any way desired or in such a way as is shown by webs 2 at the back of each wing see B, B, Fig. 1, and A, A, and B B Fig. 2. The pulleys may have any number of wings such as are shown in Figs. 1, 2, and 3, where the number shown is seven, as can be best seen in Fig. 3, A, A, and these wings may be set at any angle required, or be of any other shape than straight, if so desired. The arms of the cones may also interlace each other from either end. The pulleys may also be secured in any manner to the shaft; such as by a right and left handed screw and secured by lock nuts, (such as the nut E) Fig. 2, or the one half of the pulley may be secured in any way to the shaft, or be loose, so as to revolve on it; and the opposite side or wings may be screwed with any number of screws or may be otherwise fastened to it, (such as A' and B') Fig. 4, where A' and B' are made so that they may be opened apart, or closed together by the screws D, D, of which there may be any number, thus effecting the same purpose. And these pulleys may be made of any design as far as the general outline is concerned; and may be made of any suitable size, and of any suitable materials. These pulleys may be used in combination with an attachment to a paper ruling machine, or for any part of any other machine either as an expanding pulley, for altering the speed or for tightening the belting, or as a grip pulley for which it is well adapted. It will be noticed that both sets of interlacing arms extend outward from their hubs or base pieces and overhang or extend over the base piece or hub of the adjacent arms. By this construction a pulley of compact form is provided and one in which the strain is best sustained as the two arms crossing each other form practically an arch the sides of which incline back or inwardly to the supporting shaft.

Having now particularly described the nature of our invention, we claim for especial novelty—

1. In combination, the shaft and the two cones having two sets of interlocking arms said arms inclining outwardly from the shaft and from their hubs or base plates to which they are rigidly attached and crossing each other intermediate of the hubs and their outer ends, said arms being arranged to form an outwardly extending arch to sustain the thrust the arms forming the sides of said arch receiving the thrust in the direction of their longitudinal axis toward their hubs, substantially as described.

2. In combination, the rim, the shaft carrying the same, said rim having a series of inclined arms A', the loose rim also having a series of arms B' to interlace with the arms A', said rim with the arms B' being arranged to slide on the fixed rim and the means for adjusting and holding said movable rim, substantially as described.

Dated this 15th day of May, 1893, at Dunedin, in the British Colony of New Zealand.

ANDW. GIVEN.
CHARLES BOWTELL SMITH.

Witnesses:
A. O. FORSYTH,
HENTON M. DAVEY.